United States Patent
Dawson-Townsend

(10) Patent No.: US 11,037,453 B2
(45) Date of Patent: Jun. 15, 2021

(54) ADAPTIVE SENSE AND AVOID SYSTEM

(71) Applicant: Aurora Flight Sciences Corporation, Manassas, VA (US)

(72) Inventor: Timothy Dawson-Townsend, Lucerne (CH)

(73) Assignee: Aurora Flight Sciences Corporation, Manassas, VA (US)

( * ) Notice: Subject to any disclaimer, the term of this patent is extended or adjusted under 35 U.S.C. 154(b) by 378 days.

(21) Appl. No.: 16/159,397

(22) Filed: Oct. 12, 2018

(65) Prior Publication Data

US 2020/0118451 A1 Apr. 16, 2020

(51) Int. Cl.
*G08G 5/04* (2006.01)
*G01S 13/933* (2020.01)
(Continued)

(52) U.S. Cl.
CPC ............ *G08G 5/045* (2013.01); *G01S 13/933* (2020.01); *G05D 1/0088* (2013.01); *G05D 1/101* (2013.01);
(Continued)

(58) Field of Classification Search
None
See application file for complete search history.

(56) References Cited

U.S. PATENT DOCUMENTS 4,063,073 A 12/1977 Strayer
5,157,615 A 10/1992 Brodegard et al.
(Continued)

FOREIGN PATENT DOCUMENTS

EP 1340999 9/2003
EP 2042963 4/2009
(Continued)

OTHER PUBLICATIONS

David N. Lee, et al., Common principle of guidance by echolocation and vision; J Comp Physiol A (1992) 171:563-571.
(Continued)

*Primary Examiner* — Kelly D Williams
(74) *Attorney, Agent, or Firm* — Michael Stanley Tomsa; McAndrews, Held & Malloy, Ltd.; Eugene H. Nahm

(57) ABSTRACT

An adaptive sense and avoid system for use with an aerial vehicle in an environment, the adaptive sense and avoid system comprising a processor, a plurality of sensors, an obstacle detection circuit, and an avoidance trajectory circuit. The processor may be operatively coupled with a flight controller and a memory device, wherein the memory device comprises one or more databases. The plurality of sensors generates sensor data reflecting a position of an obstacle in the environment. The obstacle detection circuit, which is operatively coupled to the processor and the plurality of sensors, may be configured to identify obstacles based at least in part on the sensor data and to generate obstacle information that reflects a best estimate of a position of the obstacle in the environment. The obstacle detection circuit is configured to weigh the sensor data as a function of the aerial vehicle's state and its environment. The avoidance trajectory circuit, which is operatively coupled to the obstacle detection circuit and the processor, may be configured to calculate trajectory data as a function of the obstacle information and information from the one or more databases. The obstacle detection circuit is configured to communicate the trajectory data to the flight controller.

20 Claims, 6 Drawing Sheets

(51) Int. Cl.
  *G05D 1/00* (2006.01)
  *G05D 1/10* (2006.01)
  *G06K 9/00* (2006.01)
  *G08G 5/00* (2006.01)

(52) U.S. Cl.
  CPC ....... *G06K 9/00664* (2013.01); *G08G 5/0078* (2013.01)

(56) References Cited

U.S. PATENT DOCUMENTS

| | | |
|---|---|---|
| 5,283,643 A | 2/1994 | Fujimoto |
| 5,920,276 A | 7/1999 | Frederick |
| 6,064,924 A | 5/2000 | Fleischmann |
| 6,219,594 B1 | 4/2001 | Nicosia et al. |
| 6,268,803 B1 | 7/2001 | Gunderson et al. |
| 6,480,152 B2 | 11/2002 | Lin et al. |
| 6,604,044 B1 | 8/2003 | Kirk |
| 6,670,910 B2 | 12/2003 | Delcheccolo et al. |
| 6,678,210 B2 | 1/2004 | Rowe |
| 6,804,607 B1 | 10/2004 | Wood |
| 6,820,006 B2 | 11/2004 | Patera |
| 6,960,750 B2 | 11/2005 | Doane |
| 6,975,246 B1 | 12/2005 | Trudeau |
| 6,993,420 B2 | 1/2006 | Le Draoullec et al. |
| 7,059,564 B2 | 6/2006 | Dennis |
| 7,106,219 B2 | 9/2006 | Pearce |
| 7,136,011 B2 | 11/2006 | Mork et al. |
| 7,176,830 B2 | 2/2007 | Horibe |
| 7,193,729 B1 | 3/2007 | Li |
| 7,194,358 B2 | 3/2007 | Callaghan et al. |
| 7,203,630 B2 | 4/2007 | Kolb et al. |
| 7,318,564 B1 | 1/2008 | Marshall |
| 7,369,460 B2 | 5/2008 | Chiappetta et al. |
| 7,437,220 B2 | 10/2008 | Stefani |
| 7,443,154 B1 | 10/2008 | Merewether et al. |
| 7,624,943 B2 | 12/2009 | Cerchie et al. |
| 7,650,232 B1 | 1/2010 | Paielli |
| 7,714,536 B1 | 5/2010 | Silberg |
| 7,725,258 B2 | 5/2010 | Smitherman |
| 7,751,976 B2 | 7/2010 | Matuska et al. |
| 7,784,741 B2 | 8/2010 | Cerchie et al. |
| 7,791,529 B2 | 9/2010 | Filias et al. |
| 7,848,698 B2 | 12/2010 | Batcheller et al. |
| 7,954,965 B1 | 6/2011 | Boyd et al. |
| 7,982,662 B2 | 7/2011 | Shaffer |
| 8,026,827 B1 | 9/2011 | Boyd et al. |
| 8,049,658 B1 | 11/2011 | Lagonik et al. |
| 8,052,096 B2 | 11/2011 | Cerchie et al. |
| 8,167,234 B1 | 5/2012 | Moore |
| 8,172,177 B2 | 5/2012 | Lovell et al. |
| 8,232,910 B1 | 7/2012 | Burton |
| 8,290,638 B2 | 10/2012 | Eicke et al. |
| 8,306,672 B2 | 11/2012 | Nickolaou |
| 8,319,665 B2 | 11/2012 | Weinmann et al. |
| 8,319,666 B2 | 11/2012 | Weinmann et al. |
| 8,346,480 B2 | 1/2013 | Trepagnier et al. |
| 8,373,751 B2 | 2/2013 | Han et al. |
| 8,411,145 B2 | 4/2013 | Fardi |
| 8,466,827 B2 | 6/2013 | Nanami |
| 8,467,953 B2 | 6/2013 | Naderhirn |
| 8,500,067 B2 | 8/2013 | Woodworth et al. |
| 8,543,265 B2 | 9/2013 | Ekhaguere et al. |
| 8,616,883 B2 | 12/2013 | Wokurka |
| 8,616,884 B1 | 12/2013 | Lechner et al. |
| 8,700,306 B2 | 4/2014 | Duggan et al. |
| 8,768,534 B2 | 7/2014 | Lentz |
| 8,970,401 B2 | 3/2015 | Molander et al. |
| 9,052,393 B2 | 6/2015 | Kriel et al. |
| 9,097,801 B2 | 8/2015 | Kambe et al. |
| 9,352,834 B2 | 5/2016 | Davies |
| 9,507,021 B2 | 11/2016 | Lynam |
| 9,557,742 B2 | 1/2017 | Paduano et al. |
| 9,562,773 B2 | 2/2017 | Paduano et al. |
| 9,875,661 B2 | 1/2018 | Kunzi et al. |
| 2002/0004695 A1 | 1/2002 | Glenn et al. |
| 2003/0043058 A1 | 3/2003 | Jamieson |
| 2003/0222173 A1 | 12/2003 | McGeer et al. |
| 2005/0004723 A1 | 1/2005 | Duggan et al. |
| 2005/0109872 A1 | 5/2005 | Voos et al. |
| 2005/0271221 A1 | 12/2005 | Cerwin |
| 2007/0046448 A1 | 3/2007 | Smitherman |
| 2007/0195646 A1 | 8/2007 | Govindswamy et al. |
| 2007/0210953 A1 | 9/2007 | Abraham et al. |
| 2007/0236366 A1 | 10/2007 | Gur et al. |
| 2008/0027591 A1 | 1/2008 | Lenser et al. |
| 2008/0027647 A1 | 1/2008 | Ansell et al. |
| 2008/0125920 A1 | 5/2008 | Miles et al. |
| 2008/0269966 A1 | 10/2008 | Markiton et al. |
| 2008/0316010 A1 | 12/2008 | Chang |
| 2009/0164122 A1 | 6/2009 | Morbey et al. |
| 2009/0198392 A1 | 8/2009 | Eicke et al. |
| 2009/0201763 A1 | 8/2009 | Jones et al. |
| 2009/0306840 A1 | 12/2009 | Blenkhorn et al. |
| 2010/0039310 A1 | 2/2010 | Smith et al. |
| 2010/0057278 A1 | 3/2010 | Lee |
| 2010/0228408 A1 | 9/2010 | Ford et al. |
| 2010/0256909 A1* | 10/2010 | Duggan ............... G08G 5/0069 701/301 |
| 2010/0292871 A1 | 11/2010 | Schultz et al. |
| 2011/0057074 A1 | 3/2011 | Woodworth et al. |
| 2011/0066307 A1 | 3/2011 | Hiebl |
| 2011/0149067 A1 | 6/2011 | Lewis et al. |
| 2011/0160941 A1 | 6/2011 | Garrec et al. |
| 2011/0160950 A1 | 6/2011 | Naderhirn et al. |
| 2011/0171611 A1 | 7/2011 | Batcheller et al. |
| 2011/0245996 A1 | 10/2011 | Orsulak et al. |
| 2011/0307126 A1 | 12/2011 | Hogstrom |
| 2012/0065881 A1 | 3/2012 | McIver et al. |
| 2012/0130566 A1 | 5/2012 | Anderson |
| 2012/0158222 A1 | 6/2012 | Ehlin et al. |
| 2012/0199698 A1 | 8/2012 | Thomasson et al. |
| 2012/0253582 A1 | 10/2012 | Chrysanthakopoulos et al. |
| 2012/0293987 A1 | 11/2012 | Espedal et al. |
| 2013/0001366 A1 | 1/2013 | Wolff et al. |
| 2013/0110323 A1 | 5/2013 | Knight |
| 2013/0120164 A1 | 5/2013 | Greene et al. |
| 2013/0151203 A1 | 6/2013 | McEwen-King et al. |
| 2013/0175390 A1 | 8/2013 | Woodworth et al. |
| 2013/0325245 A1 | 12/2013 | Kolcarek et al. |
| 2013/0332062 A1 | 12/2013 | Kreitmair-Steck et al. |
| 2014/0012434 A1 | 1/2014 | Spence et al. |
| 2014/0080099 A1 | 3/2014 | Sowadski et al. |
| 2014/0139366 A1 | 5/2014 | Moses et al. |
| 2014/0249738 A1 | 9/2014 | Euteneuer et al. |
| 2015/0094982 A1 | 4/2015 | Dupont De Dinechin |
| 2015/0260526 A1 | 9/2015 | Paduano et al. |
| 2015/0277440 A1 | 10/2015 | Kimchi et al. |
| 2015/0323932 A1 | 11/2015 | Paduano et al. |
| 2016/0019793 A1 | 1/2016 | Fournier et al. |
| 2016/0069994 A1 | 3/2016 | Allen et al. |
| 2016/0125746 A1 | 5/2016 | Kunzi et al. |
| 2016/0171896 A1* | 6/2016 | Buchmueller ....... G08G 5/0008 701/3 |
| 2016/0266256 A1 | 9/2016 | Allen et al. |
| 2017/0045886 A1 | 2/2017 | Liu et al. |
| 2017/0345321 A1* | 11/2017 | Cross .................... B64D 45/08 |
| 2018/0032040 A1 | 2/2018 | Sweet, III et al. |
| 2018/0196435 A1 | 7/2018 | Kunzi et al. |

FOREIGN PATENT DOCUMENTS

| | | |
|---|---|---|
| EP | 2177966 | 4/2010 |
| EP | 2182419 | 5/2010 |
| EP | 2251851 | 11/2010 |
| EP | 2287633 | 2/2011 |
| EP | 2515147 | 10/2012 |
| KR | 20100081759 | 7/2010 |
| WO | 2007086055 | 8/2007 |
| WO | 2010071505 | 6/2010 |

(56) References Cited

FOREIGN PATENT DOCUMENTS

| WO | 2014/064431 | 5/2014 |
|----|-------------|--------|
| WO | 2016/035002 | 3/2016 |

OTHER PUBLICATIONS

F. Ruffier et al., Bio-Inspired Optical Flow Circuits for the Visual Guidance of Micro-Air Vehicles; IEEE 2003.
Zeitlin, Andrew et al., 'Collision Avoidance for Unmanned Aircraft: Proving the Safety Case.' The MITRE Corporation and MIT Lincoln Laboratory, Oct. 2006, pp. 1-12.
F. Ruffier, et al., Combining sound and optic flow cues to reach a sound source despite lateral obstacles; IEEE 2008.
Geoffrey Portelli, et al., A 3D Insect-Inspired Visual Autopilot for Corridor-Following; Proceedings of the 2nd Biennial IEEE/RAS-EMBS International Conference on Biomedical Robotics and Biomechatronics, Scottsdale, AZ, USA, Oct. 19-22, 2008.
G. Warwick, Bat-Inspired Tech to Aid Flight Along Streets; Aviation Week's DTI, Oct. 27, 2008.
Maryland Robotics Center, Horiuchi, Humbert Developing Bio-Inspired Navigation for Micro Air Vehicles; Oct. 29, 2008.
Liu, J., Xiao, Y., Hao, Q., and Ghaboosi, K, Bio-inspired Visual Attention in Agile Sensing for Target Detection; International Journal of Sensor Networks vol. 5, No. 2, Jan. 2009.
Whalley, M. et al., "Field-Testing of a Helicopter UAV Obstacle Field Navigation and Landing System," American Helicopter Society 65th Annual Forum Proceedings, Ft. Worth, Texas, May 2009.
Frédéric L. Roubieu, et al., A novel 1-gram insect based device measuring visual motion along 5 optical directions; IEEE 2011.
Franck Ruffier, et al., A tiny directional sound sensor inspired by crickets designed for Micro-Air Vehicles; IEEE 2011.
Junliang Tao, et al., Bio-inspired Flow and Acoustic Sensor; Proc. of SPIE vol. 8019 80190R-1, 2011.
Chamberlain, L. et al., "Self-Aware Helicopters: Full-Scale Automated Landing and Obstacle Avoidance in Unmapped Environments," American Helicopter Society 67th Annual Forum Proceedings, Virginia Beach, Virginia, May 2011.
J. Paduano et al., "TALOS: An Unmanned Cargo Delivery System for Rotorcraft Landing to Unprepared Sites," American Helicopter Society 71st Annual Forum Proceedings, Virginia Beach, Virginia, May 2011.
"Autonomous Aerial Cargo/Utility System (ARCUS): Concept of Operations (CONOPs)," The Office of Naval Research, Dec. 22, 2011.
Aurora Flight Sciences—Skate, retrieved from <www.aurora.aero/Products/skate.aspx> on Jan. 14, 2013.
Jong Jin Park, et al., abstract of "Giant Acoustic Concentration by Extraordinary Transmission in Zero Mass Metamatrials," Phys. Rev. Lett. 110, 244302 (published Jun. 13, 2013).
M. Verbandt et al., "Robust marker-tracking system for vision-based autonomous landing of VTOL UAVs," IMAV 2014.
Barry, A. and Tedrake, R.; "Pushbroom Stereo for High-Speed Navigation in Cluttered Environments," arXiv:1407.7091 [cs.RO], (Submitted on Jul. 26, 2014).
Jeong, Heejin, et al.; A Robot-Machine Interface for Full-functionality Automation using a Humanoid; 2014 IEEE/RSJ International Conference on Intelligent Robots and Systems (IROS 2014); Sep. 14-18, 2014, Chicago, IL.
J. Paduano et al., "TALOS: An unmanned cargo delivery system for rotorcraft landing to unprepared sites," Jan. 2015.
Burns, Matt, "With SkySpecs Guardian, The Drones Have Become Self-Aware," https://techcrunch.com/2015/01/06/with-skyspecs-guardians-the-drones-have-become-self-aware/, Jan. 6, 2015.
Markoff, John; A Machine in the Co-Pilot's Seat; The New York Times; Jul. 20, 2015.
Fisher, Jim, "DJI Adds Collision Collision Avoidance System to Phantom 4," http://www.pcmag.com/article2/0,2817,2500144,00.asp, Mar. 1, 2016.
Day, Carole; Your (robot) captain speaking; The Australian Financial Review; Aug. 20, 2016.
Dousse, Nicolas, "Aerial Human-Comfortable Collision-free Navigation in Defense Environments," Apr. 28, 2017.
Aurora Flight Sciences; Centaur Optionally-Piloted Aircraft brochure.
R. Brockers et al., "Autonomous landing and ingress of micro-air-vehicles in urban environments based on monocular vision".
S. Lange et al., "A Vision Based Onboard Approach for Landing and Position Control of an Autonomous Multirotor UAV in GPS-Denied Environments".
Office of Naval Research, Broad Agency Announcement No. 12-004.
UCARS-V2 UAV Common Automatic Recovery System—Version 2 for Shipboard Operations, Sierra Nevada Corporation.
Transmittal; International Search Report; and Written Opinion of the International Searching Authority for International Application No. PCT/US2015/030099 dated Aug. 17, 2015.
"International Search Report and Written Opinion, dated Jun. 21, 2017, in International application No. PCT/US2017/023523, filed Mar. 22, 2017".
International Search Report; and Written Opinion of the International Searching Authority for International Application No. PCT/US2018/012588 dated May 28, 2018.
IPR Petition PTAB-IPR2018-01704—date Sep. 11, 2018.
Extended European search report for EU application No. 19202812.4, dated Mar. 24, 2020.

* cited by examiner

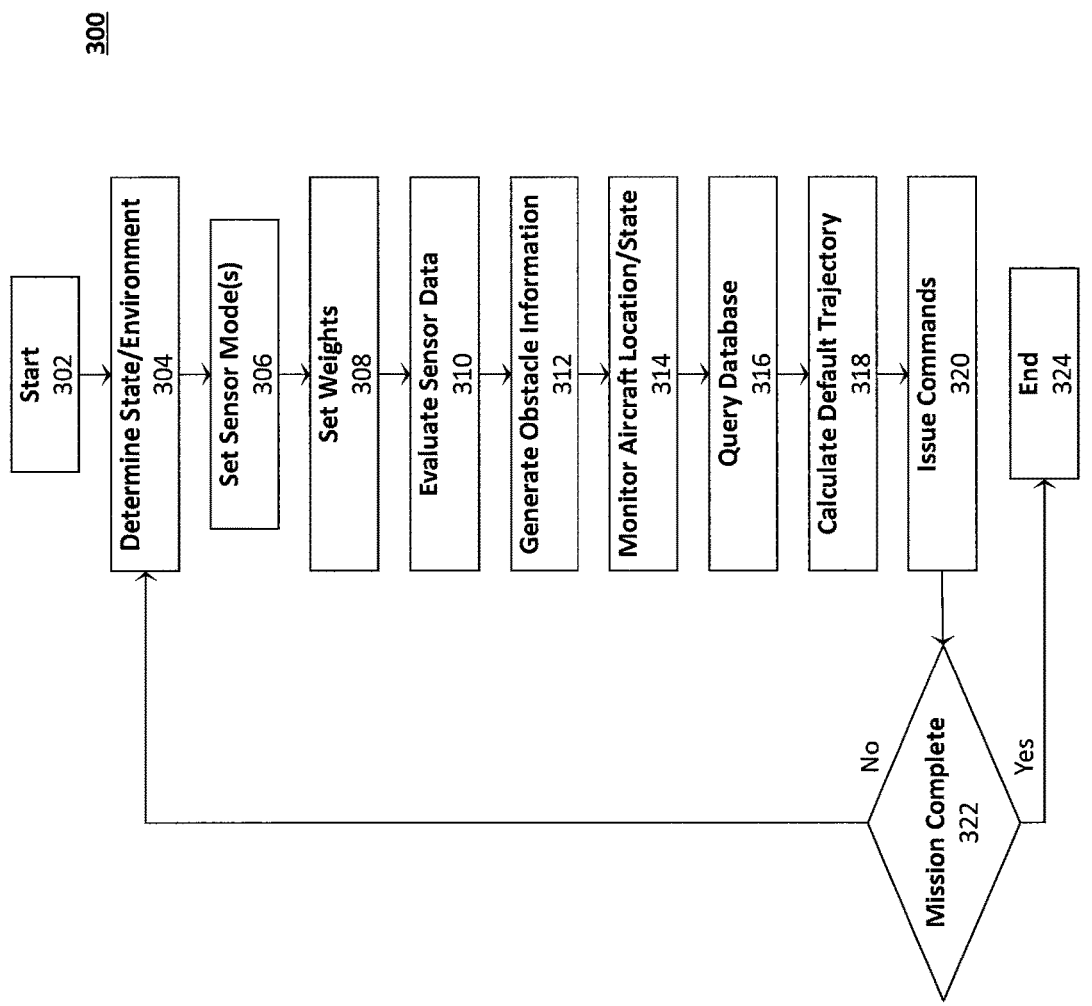

ADAPTIVE SENSE AND AVOID SYSTEM

FIELD

The present disclosure relates to the field of flight control systems, methods, and apparatuses; even more particularly, to a system, method, and apparatus for detecting and automatically navigating a vehicle around obstacles, including other airborne vehicles.

BACKGROUND

The use of Unmanned Aerial vehicles (UAVs) and Unmanned Aerial Systems (UASs) has grown in recent years. UAVs and SUASs are employed in a wide variety of applications, including both military and civilian applications. Accordingly, research is continually being performed to improve UAS autonomy. Often, such research endeavors to address multiple aspects of UAV/UAS operation, including inter alia (1) automatic flight control of a given vehicle to support remote human control, (2) optimization systems (and associated methods) to determine how, for a given vehicle or set of vehicles, tasks should be ordered and/or allocated, and (3) automatic, real-time data processing, and exploitation in support of automatic path planning, landing, and other activities.

Aircraft technology, including UAV technology, is a valuable tool for mission profiles involving intelligence, surveillance, reconnaissance, and payload delivery. In operation, aircraft may encounter both large and small obstacles within the aircraft's airspace, which may be fixed or moving, and whose position may not be known in advance. Traditional forms of obstacle detection and avoidance within an aircraft rely on a pilot to provide the critical duty of looking outside the aircraft in order to make sure that the aircraft is not on a collision course with an obstacle, such as another aircraft. Without a human pilot looking out of the cockpit, UAVs cannot guarantee that they will detect and avoid other air traffic, whether be it manned, unmanned, or natural objects (e.g., trees, mountains, etc.). Existing technology for preventing aircraft from colliding with obstacles, including obstacle databases paired with location data provided by Global Positioning System ("GPS"), are often inadequate as many obstructions may not be included in an obstacle database (especially moving obstacles) and, depending on the altitude or terrain, GPS accuracy performance varies widely across environments.

The commercial aviation industry has, however, adopted a traffic collision avoidance system ("TCAS") as a standard to avoid collisions, which allows cooperative aircraft to locate and avoid each other. A cooperative aircraft refers to an aircraft able to cooperate with a cooperative sensor. For example, a cooperative aircraft may be equipped with a TCAS (TCAS II or earlier generation), such as a Mode S or a Mode C transponder, Automatic Dependent Surveillance-Broadcast (ADS-B), or, alternatively, using other emissions and squitter messages such as ADS-B. While TCAS offers a solution to the problem of detection and avoidance of obstructions for UAVs, TCAS is only able to accomplish this objective if each UAV and obstacle contains a transponder. In other words, a cooperative target sends out its location and heading (e.g., GPS location and velocity vector) to other aircraft via radio (e.g., using ADS-B or other methods), whereas non-cooperative obstacles do not send location and heading information to others (multi-rotor aircraft, general aircraft, gliders, birds, etc.). Additionally, current flight control systems designed to detect and avoid non-cooperative obstructions utilize costly radar arrays to track obstacle obstructions and are generally only used with large scale aircraft.

While cooperative systems are useful for detecting air traffic having transponders (e.g., ADS-B), detecting non-cooperative traffic without a transponder is much more difficult. Attempts have been made, and are ongoing, to utilize small radars, camera-based visual systems, and other detection sensors for non-cooperative targets. Therefore, despite advancements, existing autonomy systems with sense and avoid capability can be improved.

SUMMARY OF THE DISCLOSURE

The present disclosure relates to the field of flight control systems, methods, and apparatuses; even more particularly, to a system, method, and apparatus for detecting and automatically navigating around stationary and/or moving obstacles.

According to a first aspect, an adaptive sense and avoid system for use with an aerial vehicle in an environment comprises: a processor operatively coupled with a flight controller and a memory device, wherein the memory device comprises one or more databases reflecting flight constraints upon the aerial vehicle; a plurality of sensors coupled to the aerial vehicle, each of the plurality of sensors configured to generate sensor data reflecting a position of an obstacle in the environment; an obstacle detection circuit operatively coupled to the processor and the plurality of sensors, the obstacle detection circuit configured to blend the sensor data from each of the plurality of sensors to identify obstacles in the environment and to generate obstacle information that reflects a best estimate of a position of the obstacle in the environment, wherein the obstacle detection circuit is configured to (i) set a sensor mode for each of a plurality of sensors based at least in part on a present state of the aerial vehicle and a condition of the environment, and (ii) assign a weight to the sensor data from each of the plurality of sensors as a function of sensor type, the present state of the aerial vehicle and the condition of the environment; and an avoidance trajectory circuit operatively coupled to the obstacle detection circuit and the processor, wherein the obstacle detection circuit is configured to (i) calculate trajectory data as a function of the obstacle information and information from the one or more databases, and (ii) communicate the trajectory data to the flight controller.

According to a second aspect, a method for navigating an aerial vehicle in an environment comprises: determining, via a processor, a state of the aerial vehicle and the environment, wherein the processor is operatively coupled with a flight controller and a memory device having one or more databases; setting a sensor mode for each of a plurality of sensors based at least in part on the state of the aerial vehicle and the environment, wherein each of the plurality of sensors is configured to generate sensor data reflecting positions of obstacles in the environment; assigning, via an obstacle detection circuit, a weight to the sensor data from each of the plurality of sensors as a function of the state of the aerial vehicle and the environment, wherein the obstacle detection circuit is operatively coupled with the processor; generating, via the obstacle detection circuit, obstacle information reflecting a best estimate for an obstacle's position in the environment; monitoring, via the processor, the state of the aerial vehicle and the environment; querying the one or more databases to identify any flight constraints upon the aerial vehicle; calculating, via an avoidance trajectory circuit, a trajectory command for the aerial vehicle as a function of the obstacle information and the one or more databases, wherein the avoidance trajectory circuit is operatively coupled with the processor; and communicating the trajectory command to the flight controller.

According to a third aspect, an aerial vehicle comprises: a flight controller; a processor operatively coupled with the flight controller and a memory device, wherein the memory device comprises (i) an airspace database of airspace data reflecting a defined legal airspace for the environment, (ii) an environment database of environment data reflecting environmental factors for the environment, and (iii) a terrain database of terrain data reflecting terrain characteristics of the environment; a plurality of sensors configured to generate sensor data reflecting a position of an obstacle in the environment; an obstacle detection circuit operatively coupled to the processor and the plurality of sensors, the obstacle detection circuit configured to blend the sensor data from each of the plurality of sensors to identify obstacles in the environment and to generate obstacle information that reflects a best estimate of a position of the obstacle in the environment, wherein the obstacle detection circuit is configured to (i) set a sensor mode for each of a plurality of sensors based at least in part on a present state of the aerial vehicle and a condition of the environment, and (ii) assign a weight to the sensor data from each of the plurality of sensors as a function of sensor type, the present state of the aerial vehicle and the condition of the environment; and an avoidance trajectory circuit operatively coupled to the obstacle detection circuit and the processor, wherein the obstacle detection circuit is configured to (i) calculate trajectory data as a function of the obstacle information and information from the one or more databases, and (ii) communicate the trajectory data to the flight controller.

In certain aspects, the one or more databases comprises (i) an airspace database of airspace data reflecting a defined legal airspace for the environment, (ii) an environment database of environment data reflecting environmental factors for the environment, and (iii) a terrain database of terrain data reflecting terrain characteristics of the environment.

In certain aspects, the obstacle detection circuit is configured to assign a first weight to sensor data from a first sensor and to assign a second weight to sensor data from a second sensor a function of the airspace data.

In certain aspects, the obstacle detection circuit is configured to assign a first weight to sensor data from a cooperative sensor and to assign a second weight to sensor data from a non-cooperative sensor a function of the airspace data, wherein the first weight is greater than the second weight.

In certain aspects, the obstacle detection circuit is configured to assign a first weight to sensor data from a first sensor and to assign a second weight to sensor data from a second sensor a function of the environmental data.

In certain aspects, the obstacle detection circuit is configured to assign a lower weight to sensor data from visual sensors when the environmental data reflects poor visibility for the environment.

In certain aspects, the obstacle detection circuit is configured to identify obstacles dynamically as a function of each of the airspace data, the environmental data, and the terrain data.

In certain aspects, the avoidance trajectory circuit is configured to calculate trajectory data dynamically as a function of at least one of the airspace data, the environmental data, and the terrain data.

In certain aspects, the adaptive sense and avoid system is communicatively coupled with a human-machine interface to provide a control and communication interface between the adaptive sense and avoid system and a human operator.

In certain aspects, the aerial vehicle is a multirotor aircraft.

In certain aspects, the aerial vehicle is a fixed-wing aircraft.

In certain aspects, the plurality of sensors comprises at least one cooperative sensor and at least one non-cooperative sensor.

In certain aspects, the at least one cooperative sensor comprises a radio-frequency transceiver configured to communicated using at least one of the ADS-B, TCAS, or TAS protocols.

In certain aspects, the at least one non-cooperative sensor includes at least one of a radar-based system, an electro-optical systems, an infrared system, an acoustic system, or a vision-based system.

In certain aspects, the at least one non-cooperative sensor comprises an acoustic system and a vision-based system.

In certain aspects, the obstacle information reflects a velocity or an identity of the obstacle.

DRAWINGS

These and other advantages of the present disclosure may be readily understood with the reference to the following specifications and attached drawings wherein:

FIG. 3 illustrates an example navigational method for operating an aircraft equipped with an ASA system.

DESCRIPTION

Figure 1A:
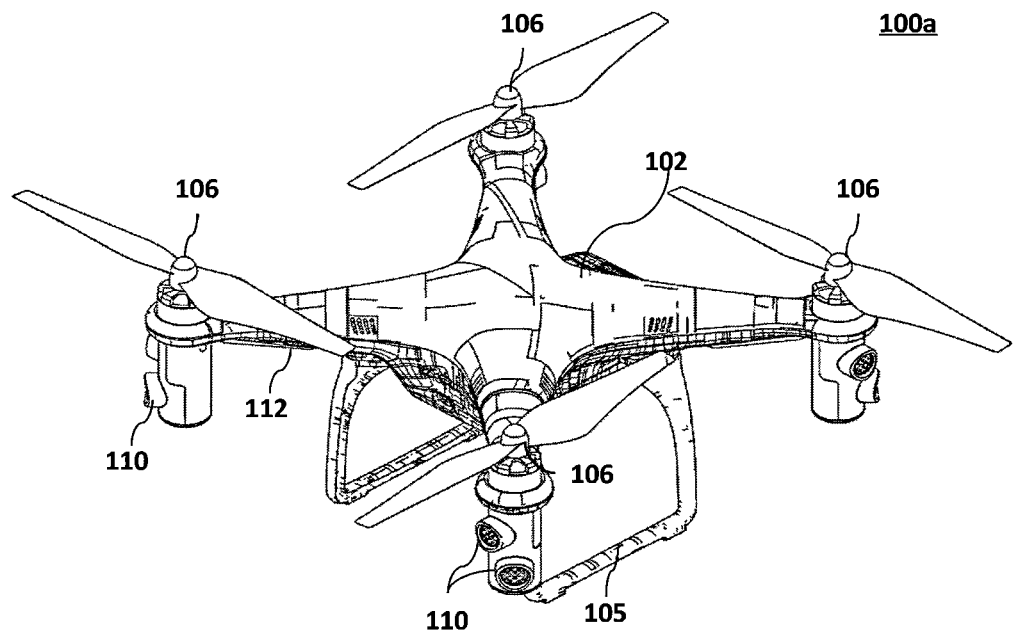
FIGS. 1a and 1b illustrate, respectively, views of an example multirotor aircraft and an example fixed-wing aircraft.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front,", "frontal", "back," and the like, are words of convenience and are not to be construed as limiting terms. The various data values (e.g., distances, seconds, etc.) provided herein may be substituted with one or more other predetermined data values and, therefore, should not be viewed limiting, but rather, exemplary. For this disclosure, the following terms and definitions shall apply:

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein are a system, method, and apparatus for detecting and automatically navigating around stationary and/or moving obstacles. UAVs, especially tactical or MALE-class UAVs, can fly in very different environments when performing missions and, as a result, may have an impact on the type of sense and avoid sensors and behavior that is ideal for different environments. For instance, UAVs may fly a relatively high altitude (~15,000 feet above ground level) or descend to a relatively low altitude (~1,000 feet above ground level), depending mission or weather factors. Especially at lower levels, terrain can then also play a larger role, depending if nearby terrain is flat, hilly, or mountainous. These UAVs may also be operating in different types of airspace. The same type of sense and avoid sensing and response may not be appropriate for different types of airspace. For instance, in high-altitude airspace under radar surveillance, non-cooperative obstacles are less likely, while at lower altitudes these targets may be the highest risk. Therefore, the disclosed sense and avoid system adapts the fusion (e.g., blends) of sensors depending on the altitude, geographic area, and/or airspace in which the vehicle is navigating. An advantage of the disclosed adaptive sense and avoid system over prior systems is that the adaptive sense and avoid system optimizes operation of the UAVs for different altitude ranges, airspaces, and other contexts, thereby providing the best safety while minimizing deviations for false alarms, etc.

Figure 1B:
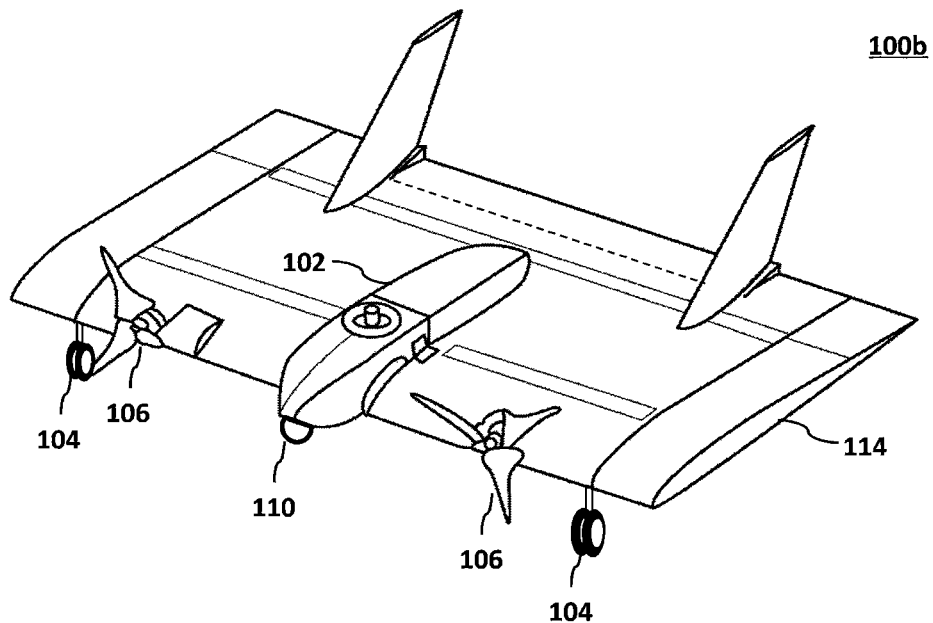

FIGS. 1a and 1b illustrate perspective views of example aerial vehicles 100 for use with an adaptive sense and avoid system, namely a multirotor aerial vehicle 100a and a fixed-wing aerial vehicle 100b. More specifically, FIG. 1a illustrates an exemplary autonomous multirotor aerial vehicle 100a (illustrated as a quadcopter) capable of vertical take-off and landing, while FIG. 1b illustrates a fixed wing aircraft 100b. In either case, the aerial vehicles 100 may comprise an airframe 102 (e.g., a fuselage or chassis), landing gear 104, a flight control system 120 (better illustrated in FIG. 1c), and one or more thrust generators 106 to provide lift or thrust (e.g., a turbine, a motor 108 or engine 118 operatively coupled with a propeller, etc.). The flight control system 120 may be housed at least in part within an electronics module, which can be integrated with the airframe 102, provided via a separate housing or pod, or a combination thereof. In the case of the multirotor aerial vehicle 100a, the thrust generators 106 may be coupled to the airframe 102 via a plurality of rotor booms 112. In the case of the fixed wing aircraft 100b, one or more fixed wings 114 may be coupled to the airframe 102. While the one or more fixed wings 114 may be distinct from the airframe 102, the fixed wing aircraft 100b may instead be configured as a blended-wing or flying-wing configuration.

Regardless of configuration, the aerial vehicle 100 may comprise one or more sensors 110 (e.g., as part of an intelligence, surveillance, and reconnaissance (ISR) payload 140 or separately therefrom), such as echolocation sensors, which generally function by emitting a sound frequency into an environment and detecting any echoes of the sound frequency that return from obstacles near the echolocation sensors. Using the strength of the echo and/or direction of echo's return, the echoes may be used to locate and/or identify obstacles, which in turn may cause the aerial vehicle to change direction so as to avoid collision with one or more obstacles. The sensors 110, however, are not limited to echolocation sensors and may include, inter alia, any vision-based sensor or acoustic sensor known in the art or that will become known in the art, including, without limitation, cameras, radar, LIDAR, and the like. In one aspect, cameras may be used to identify larger objects through three-dimensional reconstruction techniques such as optical flow. While this may provide useful information for autonomous navigation, the processing latency associated with optical imaging, as well as the sensitivity to the visibility of various types of objects, may limit the utility of optical sensing techniques for detecting small, rapidly approaching objects in a line of flight of a vehicle. Therefore, echolocation may be used to supplement vision sensing systems.

The sensors 110 may be positioned to obtain a field of view in the aerial vehicle's direction of travel, thereby identifying potential obstacles in the aerial vehicle 100's path. For example, a single sensor 110 (or single group of sensors 110) may be provided at the front of the aerial vehicle 100 to detect a threat of collision (e.g., obstructions or obstacles) in the path of the aerial vehicle 100. By orienting the sensors 110 toward the line of flight, acoustic detection may supplement optical detection and be used for detecting immediate obstructions that should trigger the execution of responsive maneuvers by a vehicle. While acoustic detection is provided as an example, interactions from virtually any kind of sensor may be used or blended. Moreover, as demonstrated by the autonomous multirotor aerial vehicle 100a, a plurality of sensors 110 (or multiple groups of sensors) may be positioned around the perimeter (and/or top and bottom) of the aerial vehicle 100 to provide a field of view that is oriented with the aerial vehicle 100's line of flight, as well as above and below the aerial vehicle 100, such that the plurality of sensors cover the environment surrounding the aerial vehicle 100. Accordingly, the plurality of sensors 110 would enable the aerial vehicle 100 to detect a threat of collision on any side of the aerial vehicle 100, effectively providing a 360 degree field of view around the aerial vehicle 100.

It will be appreciated that an objective of the acoustic sensors is to provide immediate detection of obstacles directly in a flight path (or other line of travel), particularly obstacles that might not be detected using visual detection or other techniques. Correspondingly, it should be appreciated that an objective of the sensors 110 is to provide immediate detection of obstacles in a specific direction (e.g., any direction of the aerial vehicle), particularly obstacles that might not be readily detected using visual detection or other techniques. While an echolocation array operates well, other sensor systems may also, or instead, be suitably employed for rapid, accurate detection of obstacles, such as laser-based techniques or any other suitable techniques using optical, acoustic, radio frequency, or other sensing modalities. Any such technique suitable for implementation in an autonomous vehicle and capable of accurately and quickly identifying obstructions may be used in lieu of (or to supplement) the echolocation sensors in the systems and methods contemplated herein. For example, the adaptive sense and avoid system may employ a combination of vision- and acoustic-based sensors, as well as radar-based or LIDAR systems.

Figure 1C:
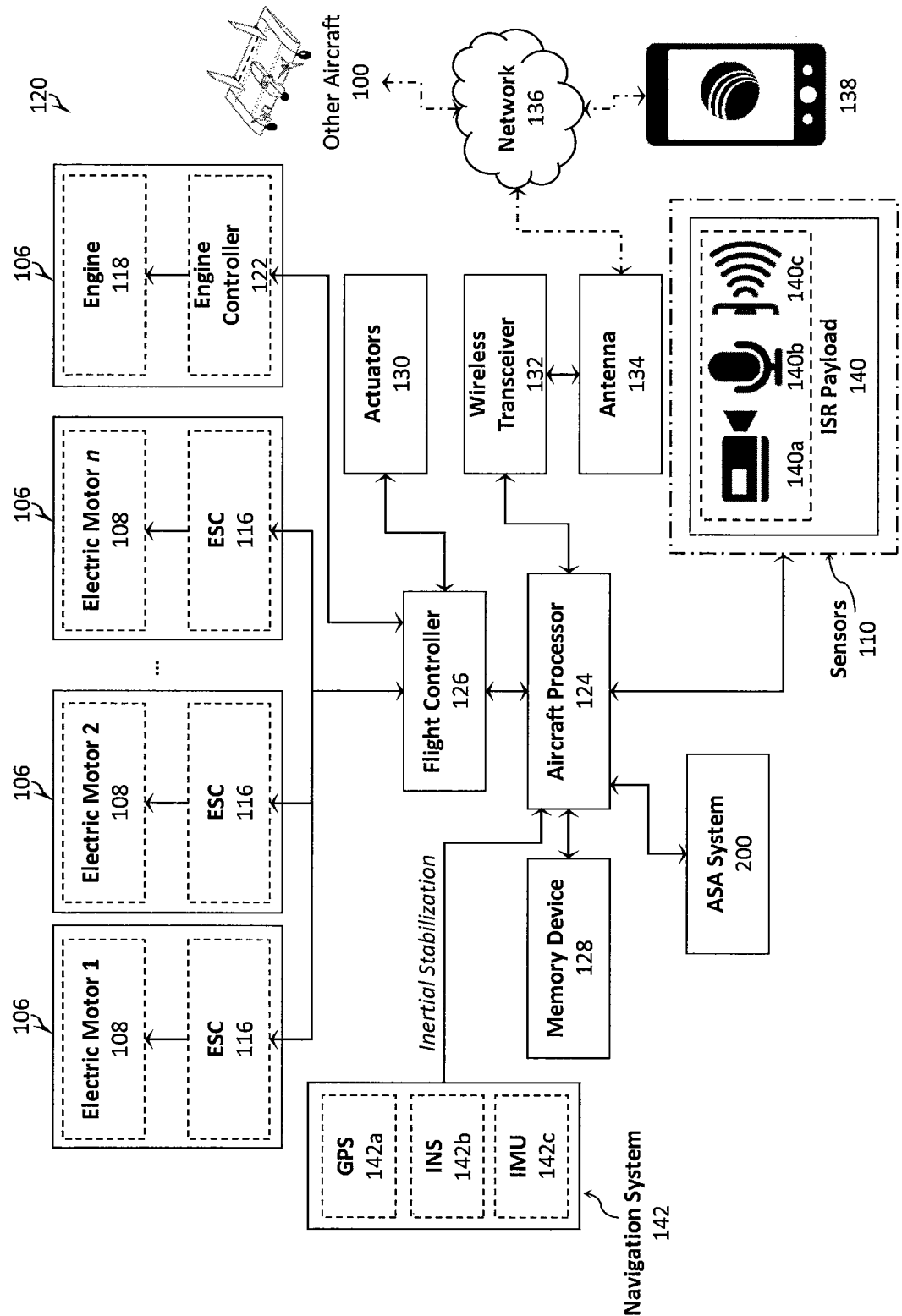
FIG. 1c illustrates a block diagram of an example flight control system for the aircraft of FIGS. 1a and/or 1b.

FIG. 1c illustrates a block diagram of an example flight control system 120 for the aerial vehicle 100. The flight control system 120 may be configured to control the various components and functions of the aerial vehicle 100. As illustrated, the flight control system 120 includes one or more aircraft processors 124 communicatively coupled with at least one memory device 128, a flight controller 126, a wireless transceiver 130, and a navigation system 142. The aircraft processor 124 may be configured to perform one or more operations based at least in part on instructions (e.g., software) and one or more databases stored to the memory device 128 (e.g., hard drive, flash memory, or the like). The aircraft control system may further include other desired services, such as a wireless transceiver 130 coupled with an antenna 132 to communicate data between the flight control system 120 and a remote device 138 (e.g., a portable electronic devices, such as smartphones, tablets, laptop computers) or other controller (e.g., at a base station). The flight control system 120 may also communicate with another aerial vehicle 100 via the wireless transceiver 130, thereby facilitating collaborative operations, for example.

In certain aspects, the flight control system 120 may communicate data (processed data, unprocessed data, etc.) with the remote device 138 and/or another aerial vehicle 100 over a network 134. In certain aspects, the wireless transceiver 130 may be configured to communicate using one or more wireless standards such as longer-range links, C-band, Ku/Ka-band, Ultra-High Frequency (UHF) radio waves in the Industrial, Scientific, and Medical (ISM) band from 2.4 to 2.485 GHz), Wi-Fi (e.g., Institute of Electrical and Electronics Engineers' (IEEE) 802.11 standards), etc. The remote device 138 may facilitate monitoring and/or control of the flight control system 120 and its payload(s), including an ISR payload 140.

The remote device 138 provides a control and communication interface for the user. The remote device 138 may be configurable to operate as a manager that enables the user to monitor, direct, and control the ASA system 200. The remote device 138 can be used to enable a user to input tasks, constraints, revise task assignment lists, update software/firmware, etc. The remote device 138 may include a touch screen graphical user interface ("GUI") and/or speech-recognition systems. The remote device 138 may employ, for example, a tablet computer, a laptop computer, a smart phone, or combination thereof. The remote device 138 serves as a primary channel of communication between the pilot and the ASA system 200, enabling the user to, where desired, command tasks to and receive feedback or instructions from the ASA system 200. The remote device 138 may give visual and auditory alerts to direct the pilot's attention to a particular alert.

The aircraft processor 124 may be operatively coupled to the flight controller 126 to control operation of the various actuators (e.g., those to control movement and locking of any flight surfaces, such as the moveable flight control surfaces, electric motor 108 (e.g., via an electronic speed controller (ESC) 116), and/or engines 118 (e.g., via an engine controller 122) in response to commands from an operator, autopilot, a navigation system 142, or other high-level system via the wireless transceiver 130. In certain aspects, the aircraft processor 124 and the flight controller 126 may be integrated into a single component or circuit. In operation, the flight controller 126 may dynamically (i.e., in real-time or near real-time) and independently adjust one or more moveable flight control surfaces and/or thrust from the thrust generators 106 during the various stages of flight (e.g., via the ESC 116 or engine controller 122 (as the case may be)) to control roll, pitch, or yaw of the aerial vehicle 100. When rotors with rotor blades (e.g., propellers) are used, the flight controller 126 may vary the revolutions per minute (RPM) of the rotor and/or, where desired, vary the pitch of the rotor blades. For example, the electric motors 108 may be controlled by adjusting power supplied to each electric motor from a power supply (e.g., a battery pack or a battery bank) via the ESC 116.

The aircraft processor 124 may be operatively coupled to the navigation system 142, which may include the GPS 142a that is communicatively coupled with the INS 142b and/or the IMU 142c, which can include one or more gyros and accelerometers. The GPS 142a gives an absolute drift-free position value that can be used to reset the INS solution or can be blended with it by use of a mathematical algorithm, such as a Kalman Filter. The navigation system 142 may communicate, inter alia, inertial stabilization data to the aircraft processor 124.

To collect data and/or monitor an area, the flight control system 120 may be equipped with additional sensors 110, such as an ISR payload 140 comprising, for example, one or more cameras 140a (e.g., an optical instrument for recording or capturing images and/or video, including light detection and ranging (LiDAR) devices), audio devices 140b (e.g., microphones, echolocation sensors, etc.), and other sensors 140c to facilitated ISR functionality and provide ISR data (e.g., photographs, video, audio, sensor measurements, etc.). The ISR payload 140 is operatively coupled to the aircraft processor 124 to facilitate communication of the ISR data (sensor data) between the ISR payload 140 and the aircraft processor 124. The ISR data may be used to navigate the aerial vehicle 100 and/or otherwise control the flight control system 120. In certain aspects, the ISR payload 140 may be rotatably and pivotally coupled to, for example, the underside surface of the airframe 102 (or another structural component, such as the rotor booms 112 or the wings 114) via a gimbal system to enable the ISR payload 140 to be more easily oriented downward to monitor objects below and/or on the ground. The data may be dynamically or periodically communicated from the flight control system 120 to the remote device 138 over the network 134 via the wireless transceiver 130, or stored to the memory device 128 for later access or processing.

The below-described ASA system 200 may be integrated with the flight control system 120 such that it uses preexisting hardware, including, for example, the aircraft processor 124, memory device 128, flight controller 126, and sensors 110. In this example, the features and processes of the ASA system 200 may be implemented in the aircraft 100 through a software and/or firmware update (e.g., to the memory device 128 via the remote device 138). In another example, the ASA system 200 may be couple to the aircraft 100 as a module that is communicatively coupled with the flight control system 120 (e.g., via the aircraft processor 124, as illustrated in FIG. 1c).

Figure 2A:
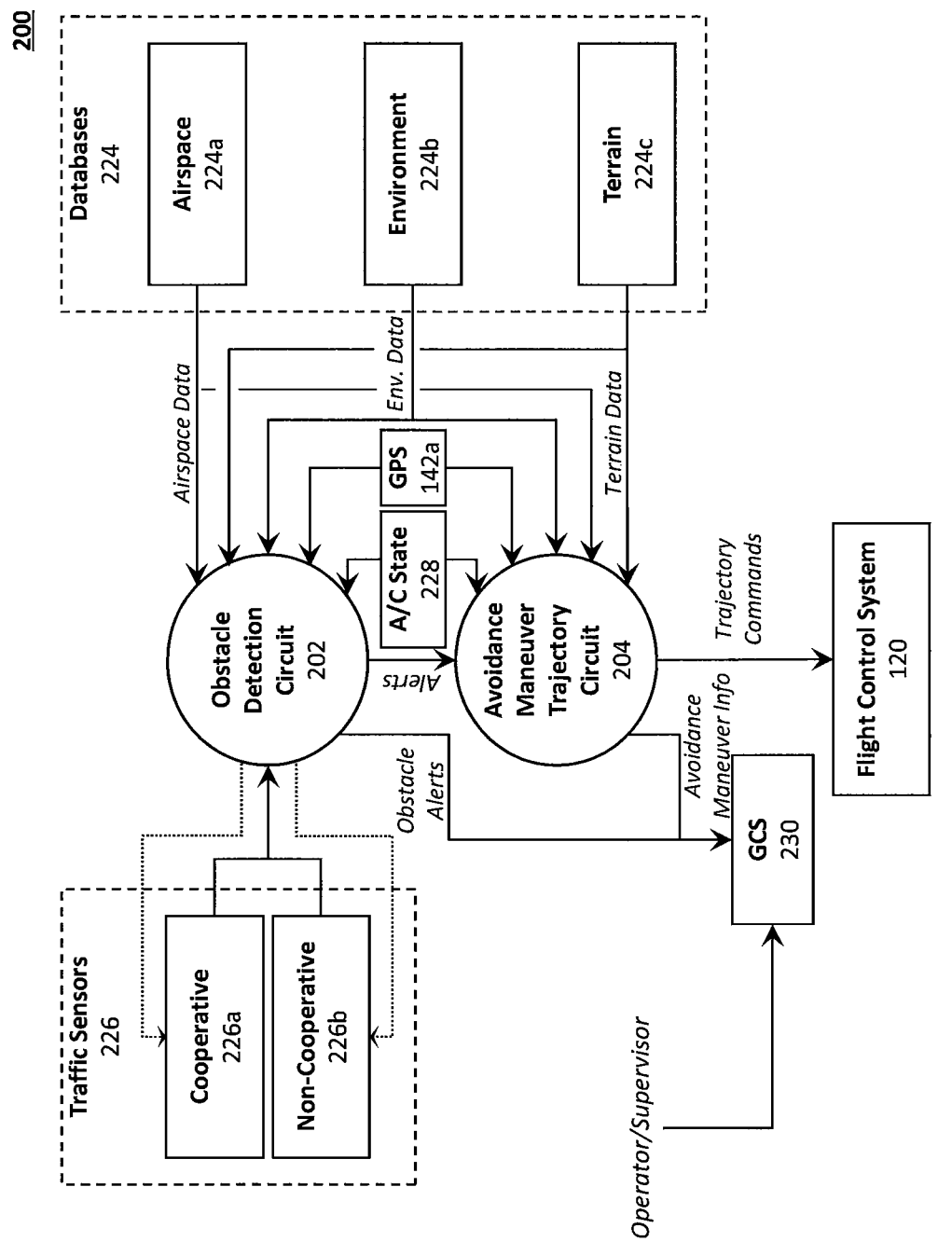
FIGS. 2a through 2c illustrate an adaptive sense and avoid (ASA) system for the automatic detection and avoidance of obstacles.
Figure 2B:
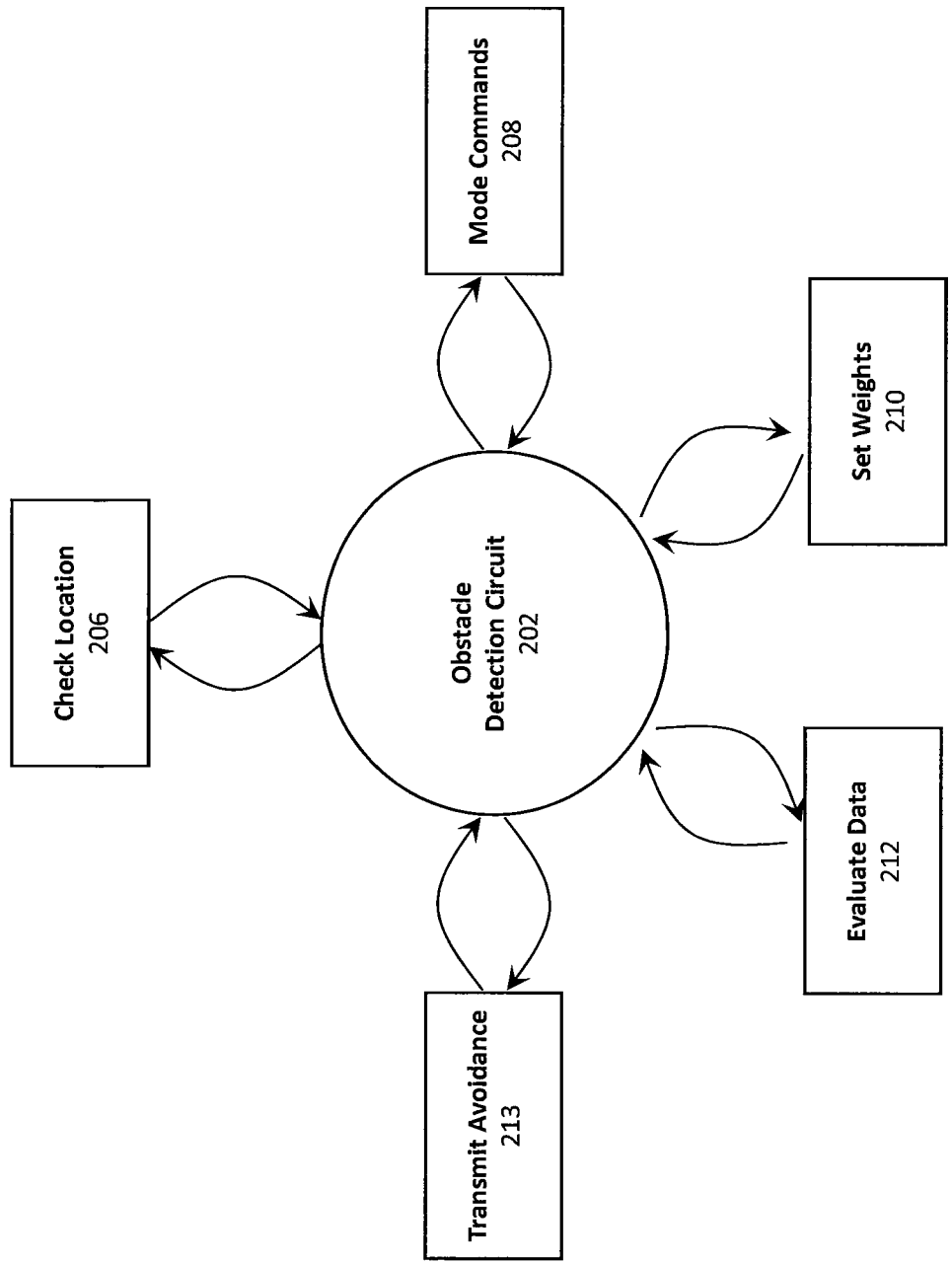
Figure 2C:
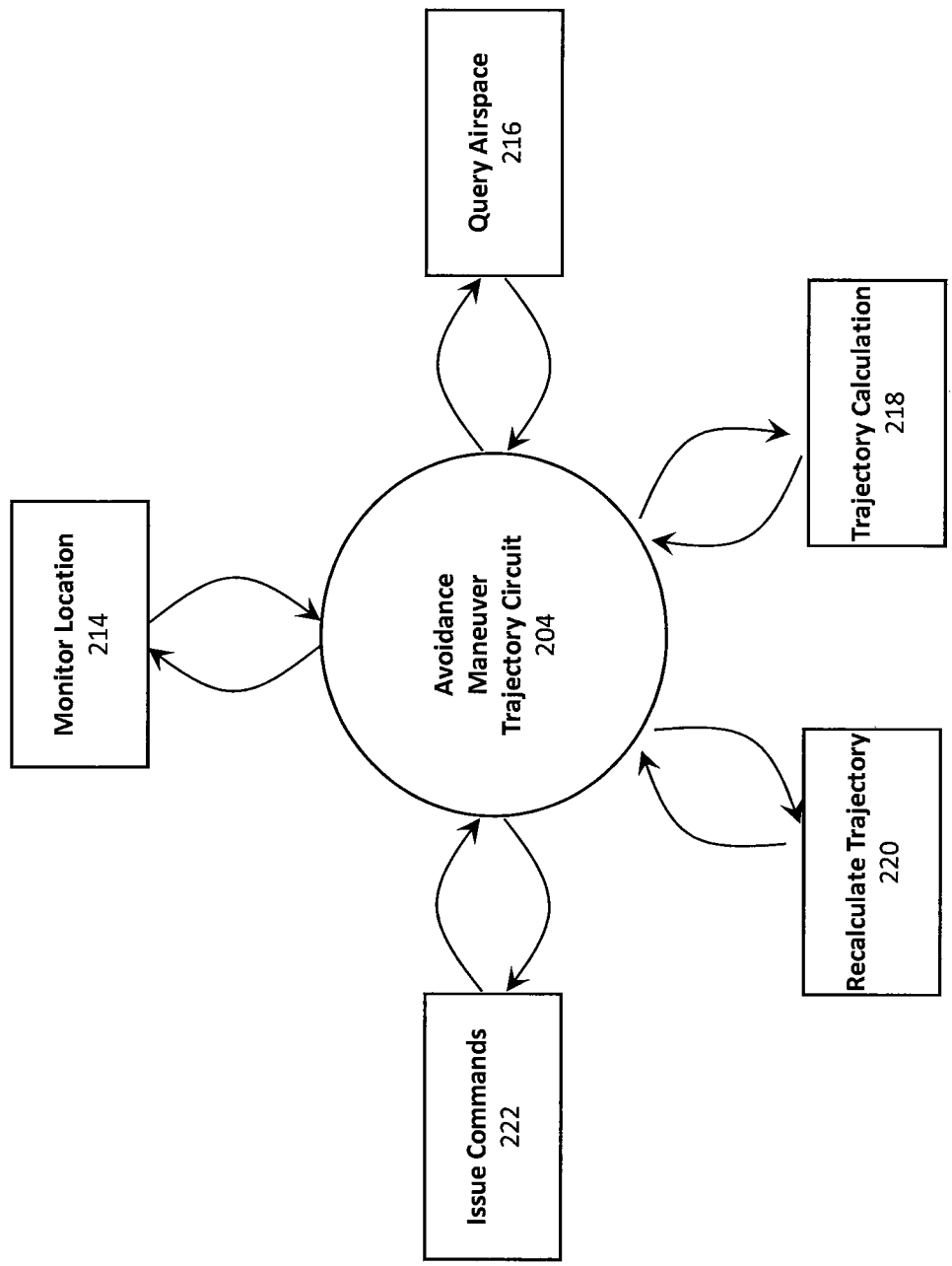

FIGS. 2a through 2c illustrate an adaptive sense and avoid (ASA) system 200 for the automatic detection and avoidance of obstacles (e.g., other air traffic, structures, natural formations, animals, etc.) to be utilized on an aircraft 100. The ASA system 200 fuses sensors (e.g., dynamically—in real-time or near real-time) as a function of the altitude, geographic area, and/or airspace in which the aircraft 100 is flying. The ASA system 200 may be configured to pass warning alerts and status to any ground operator or supervisor through an existing datalink (e.g., to a remote device 138 over network 136) on the UAV aircraft 100. In operation, the ASA system 200 endeavors to detect cooperative and/or non-cooperative obstacles and to command an automatic avoidance maneuver to avoid a collision with the obstacle and/or other obstacles. The ASA system 200 cross-correlates and blends multiple obstacle sensors to develop the most accurate estimation of the position(s) and type(s) of obstacle(s) in an environment.

The ASA system 200 offers a number of advantages. For example, in addition to altitude, geographic area, and/or airspace, the ASA system 200 may further adapt the fusion of sensors as a function of the time of day, current weather, and season of the year. There may be multiple areas of fusion, such as weighting of the different sensors for refining obstacle position relative to the host aircraft, and any assigning priority for alerting or avoidance maneuvers. For instance, depending on current location (airspace type), an obstacle detection radar might be given a higher priority for obstacle detection, while visual sensors neglected. In another example, when operating inside an airport terminal area, cooperative sensors (e.g., ADS-B data) could be given a highest priority for weighting, with less priority on visual sensors. In another example, during summertime operations in areas known to be popular with hang gliders or other non-cooperative obstacles, sensors for such obstacles will be given priority (such as visual sensors or small radar.) Sensors capable of detecting hazardous bird obstacles would also be given higher priority when operating in locations and times of the day or times of the year when bird activity is expected to be high.

Using the ASA system 200, the aircraft 100 may perform automatic obstacle avoidance maneuvers to account for local terrain conditions, which can avoid potential collisions with terrain while avoiding obstacles. Therefore, the ASA system 200 may employ a model of aircraft performance, which can be used to determine possible collision-avoidance trajectories that will be successful. The ASA system 200 may also take into account weather conditions when calculating obstacle avoidance maneuvers. For example, the ASA system 200 may account for ambient winds or density altitude when determining optimal trajectories, and avoiding weather hazards in the immediate vicinity.

With reference to FIG. 2a, the ASA system 200 may generally comprise an obstacle detection circuit 202, an avoidance maneuver trajectory circuit 204, one or more databases 224, and obstacle sensors 226 (e.g., one or more sensors 110) to generate lists of possible obstacle threats. The ASA system 200 may be operatively coupled with (or integrated with) the flight control system 120 of the aircraft 100. Accordingly, the obstacle detection circuit 202 and/or the avoidance maneuver trajectory circuit 204 may receive positional data from an external GPS or an integrated (internal) GPS (e.g., GPS 142a) and/or aircraft state data (e.g., altitude, speed, A altitude, etc.) from the aircraft data system 228. In addition to position data, the ASA system 200 may receive aircraft state information (e.g., altitude, rate of climb, pitch angle, bank angle, yaw angle, sideslip, etc.) from an aircraft data system 228, which may be integrated with the aircraft 100 (e.g., as part of the flight control system 120). The aircraft data system 228 may comprise, for example, a gyro and/or other state sensors.

When a threat (e.g., a potential collision threat or other obstacle) is detected, the ASA system 200 can issue trajectory commands to the onboard flight control system 120 of the aircraft 100, which may cause (instruct) the aircraft 100 to execute an avoidance trajectory (or flight path). The avoidance trajectory may be calculated in real-time based at least in part on sensor data from the sensors 110, ISR payload 140, etc. The ASA system 200 can also pass warning alerts and status information to any ground operator or supervisor via, for example, a remote device 138 at a ground control station (GCS) 230 through an existing datalink on the aircraft 100, such as network 136. More specifically, the obstacle detection circuit 202 may send obstacle alerts to the GCS 230, while the avoidance maneuver trajectory circuit 204 may send avoidance maneuver information to the GCS 230.

The plurality of obstacle sensors 226 may comprise, for example, cooperative obstacle sensors 226a to detect cooperative obstacle (e.g., another aircraft having a cooperative transmitter or transceiver) and/or non-cooperative obstacle sensors 226b to detect non-cooperative obstacle. The cooperative obstacle sensors 226a may be used to detect obstacles (e.g., other air traffic) using, for example, a radio-frequency transceiver configured to communicated using one or more of various protocols, including ADS-B, TCAS, TAS, etc. The non-cooperative obstacle sensors 226b may detect obstacles (e.g., other air traffic) using, for example, radar-based systems, electro-optical systems (e.g., LIDAR), infrared systems, acoustic systems, vision-based systems, etc. In some cases, the obstacle sensors 226 may assign a threat level (priority level) to one or more (or all) of possible obstacle threats, in other cases they may not; instead only providing location information for the other obstacles. For example, location information may include GPS coordinates or angle and distance. Obstacle information from the obstacle sensors 226 may also include velocity of the target obstacle and/or information on the type or identity of the obstacles (e.g., aircraft, tail number, bird, size, etc.). The type of sensors 110 used as the obstacle sensors 226 may depend on the type and size of aircraft 100 being considered and the operating environment of that aircraft 100.

The one or more databases 224, which may be stored to memory device 128, can be used to identify any flight constraints imparted upon the aircraft 100. To that end, the one or more databases 224 may comprise, for example, an airspace database 224a, an environment database 224b, a terrain database 224c, etc. The one or more databases 224 may cover a larger area than expected for current operations of the aircraft 100; however the one or more databases 224 may be limited to a specific area/environment if desired. The ASA system 200 may update the one or more databases 224 dynamically to reflect the most current data available, which may be captured by the obstacle sensors 226 or another sensor 110. The one or more databases 224 (in connection with the obstacle sensors 226 and any other sensors 110) support the obstacle detection circuit 202 for calculating obstacle threats. Once a threat has been detected, the one or more databases 224 support the avoidance maneuver trajectory circuit 204, by providing information on airspace, terrain, and/or environmental factors that affect the trajectory.

The airspace database 224a may comprise airspace data reflecting airspace and aeronautical features. The airspace database 224a holds detailed data on all types of defined legal airspace in the area of operations including, without limitation: control zones, traffic management areas, en route airspace, restricted areas, prohibited areas, temporary flight restrictions, military operating areas, etc. Further, data reflecting established airways and approach procedures may also be included. The environment database 224b may comprise environment data reflecting environmental factors, including current and expected weather, local effects of time of day or time of year, etc. The environmental database 224b may include, without limitation, obstacle data, expected climate data, current and pending weather data, and human activity data (expected events or activity in a given area in a given time period). Finally, the terrain database 224c may comprise terrain data reflecting terrain clearance, including specific man-made or natural features, such as peaks, antenna towers, buildings, etc., for example. The terrain database 224c holds detailed data on the terrain in the area of operations. The terrain database 224c may cover a larger area than expected for current operations, or data for specific areas can be loaded as required. The terrain database 224c can be updated by the aircraft 100 with the most current data available, for accuracy.

The obstacle detection circuit 202 can use input from sensors to determine the best estimate of obstacles (e.g., type, location, trajectory, etc.). Obstacle detection circuit 202 may be used to correlate data (e.g., using internal algorithms) from multiple sensors to refine obstacle location, and to determine the threat level of detected obstacles. For example, as illustrated, the obstacle detection circuit 202 may receive sensor state and obstacle information from the cooperative obstacle sensors 226a and/or non-cooperative obstacle sensors 226b. The obstacle detection circuit 202 may also be configured to communicate mode commands 208 to the cooperative obstacle sensors 226a and/or non-cooperative obstacle sensors 226b. The mode commands 208 may cause the cooperative obstacle sensors 226a and/or non-cooperative obstacle sensors 226b to change, or otherwise adjust, its mode of operation. Further, in certain aspects, one or more machine learning techniques may be employed and used to fuse sensor data from different types of sensors based at least in part on historic performance data associated with the aerial vehicle 100 (e.g., in various situations and environments, such as weather condition, time, location, altitude, etc.). For example, while certain sensors systems may not be ideal in certain environments, historical data may indicate that such sensors systems are nevertheless favorable or useable in certain regions when subject to certain environmental conditions or coupled with other types of sensors.

The obstacle detection circuit 202 also uses information about vehicle location, compared from the aircraft data system 228 against the one or more databases 224 of geography, airspace, and environmental factors to set weighting of the cooperative obstacle sensors 226a and/or non-cooperative obstacle sensors 226b via the obstacle detection circuit 202. For example, the obstacle detection circuit 202 can use airspace data from the airspace database 224a to refine the detection algorithms based on the location of the aircraft 100 in relation to different types of regulated airspace. In another example, the obstacle detection circuit 202 can use environmental data from the environmental database 224b refine the detection algorithms based on environmental factors such as time of year, day of week, time of day, climate and weather conditions, etc. Based on the various input from sensors and databases, the obstacle detection circuit 202 may output to the avoidance maneuver trajectory circuit 204 a best estimate of obstacles in the form of, for example, obstacle alert information/data.

The avoidance maneuver trajectory circuit 204 can use internal algorithms to calculate an avoidance maneuver to avoid detected obstacle and terrain based at least in part on the obstacle alert information/data from the obstacle detection circuit 202. In other words, the avoidance maneuver trajectory circuit 204 is configured to develop an avoidance trajectory to ensure safe separation from obstacle targets, while also accounting for local terrain, airspace, and environmental factors based on data from the one or more databases 224. For example, the avoidance maneuver trajectory circuit 204 can use terrain data from the terrain database 224c to ensure avoidance maneuvers are not compromised by local terrain. In certain aspects, different groupings of the plurality of sensors may be blended and/or selected depending on the current operation (i.e. mission objective) and/or environment of the aerial vehicle 100. For example, one or more sensor groupings may be employed, whether automatically or manually selected, based on the surrounding environment. The one or more database may store one or more predetermined groupings of sensors to be utilized upon detection of certain environmental conditions, aerial vehicle operation, aerial vehicle health or status, and/or flight constraints imparted upon the aerial vehicle 100.

FIG. 2b illustrates an example process for the obstacle detection circuit 202. The subtasks of the obstacle detection circuit 202 may run dynamically to provide the fastest response to potential obstacle threats. The obstacle detection circuit's 202 subtasks may include checking current aircraft state and environment 206, setting sensor modes 208, setting obstacle detection weights 210, evaluating incoming obstacle data 212, and transmitting obstacle threat information to the avoidance maneuver trajectory planner 213.

When checking current aircraft state and environment 206, the obstacle detection circuit 202 constantly monitors the aircraft state and environment from the aircraft data system 228. Example aircraft states include, for example, a current altitude, airspeed, and type of mission (e.g., transiting versus loitering). The obstacle detection circuit 202 also checks current location in relation to airspace and environment. For example, the aircraft's 100 location in relation to defined airspace, its location in relation to ground features (e.g., urban areas and rural areas), and its location in relation to terrain features such as hills and mountains.

The obstacle detection circuit 202 may also set any sensor modes 208 as necessary, which may be as a function of the current aircraft state and environment. For compatible sensors, the obstacle detection circuit 202 can send mode commands to the obstacle sensors 226 to set particular sensor modes as a function of the current aircraft state and environment. For instance, when the aircraft 100 is in a transiting mission, obstacle sensors 226 may be directed to a mode that emphasizes the area in front of the aircraft, while if the aircraft is in a loitering mission, sensor modes that examine 360 degrees around the aircraft 100 would be selected. In another example, if operating at a low level, a radar sensor may be commanded to a mode that does more to reject ground clutter in the radar signal.

The obstacle detection circuit 202 can also set obstacle detection weights 210 based on current state and environment, as well as currently-active sensors 226. Based on the environmental factors described above, the obstacle detection circuit 202 sets weighting factors for evaluating the obstacle data coming from the sensors. For instance if current weather conditions include poor visibility, data from a radar sensor may be given a greater weight than data from a vision-based sensor. In another case, when flying in controlled airspace where other obstacles would be expected to be equipped with cooperative systems, such cooperative obstacle sensors would be given higher weights than non-cooperative obstacle sensors like vision systems. The exact degree or level of weighting can be determined through a combination of analysis, simulation, and collection of empirical data.

Using weighted sensor data, the obstacle detection circuit 202 can evaluate incoming obstacle data 212 using, for example, weighted sensor values. In other words, with the obstacle detection weights already set, the obstacle detection circuit 202 evaluates the incoming obstacle data. Where multiple sensors 226 detect the same obstacle, the obstacle detection circuit 202 can use the obstacle detection weights to cross-check and refine the relative position of the obstacle. For instance, if a radar sensor and a vision sensor both detect what appears to be an obstacle, but the reported relative positions are slightly off, if the radar sensor has a higher weighting than the vision sensor, then the actual position of the obstacle will be assumed to be closer to the data reported by the radar sensor. Since the obstacle detection weights are based on changing aircraft and environment factors, the action of the obstacle detection circuit 202 may also change as the weighting factors between sensors may change as a function of the aircraft and environmental factors.

Finally, the obstacle detection circuit 202 can communicate obstacle threat information (e.g., obstacle position and state) 213 to the avoidance maneuver trajectory circuit 204. The obstacle detection circuit 202 can share the obstacle threat information dynamically (e.g., in real-time or near real-time) with the avoidance maneuver trajectory circuit 204. The obstacle detection circuit 202 may be configured to share not only the highest-priority obstacle targets, but also other detected obstacles to provide a complete picture of the obstacle(s) in the area to the avoidance maneuver trajectory circuit 204. The obstacle detection circuit 202 may use advanced logic such as machine learning to refine the ability to detect obstacles while minimizing false positive detections. Such machine learning may build and then use a database of information gathered on previous flights. Such a database may include a hot spot of geographic areas or temporal or environmental factors where other obstacles (e.g., air traffic) are often detected, or conversely areas where false positives are likely for environmental or other reasons.

By employing a system that uses machine learning/deep learning techniques for capturing information associated with an aerial vehicle, determining a condition of the aerial vehicle, and/or generating a response for the aerial vehicle to engage with the environment, the system is capable of avoiding potentially hazardous situations. For example, information collected from the various sensors can be compiled and analyzed as a whole, in view of stored data including historical trends, to quickly and accurately build a picture of an aerial vehicle's expected and/or common reaction to a variable. In other words, the system may be configured to accept, analyze, and/or make determinations based at least in part on the various sensor information, or "sensor fusion", among sensors of differing types, such as optical sensors, physiological sensors, vehicle state sensors, to name but a few. Thus, machine learning/deep learning techniques, capable of collecting data and building models over time to recognize and adapt to similar situations in the future, are used to overcome limited views, damaged identifiers, variable lighting conditions, to name a few. Similarly, the machine learning technique may be utilized to update the logic of determining the selection of a group of the various sensors in certain environmental conditions by analyzing the effectiveness of the selected group in various environmental conditions.

As noted above, the avoidance maneuver trajectory circuit 204 evaluates the obstacle threats reported by the obstacle detection circuit 202 and plans avoidance maneuver(s) to avoid conflicts or collisions. FIG. 2c illustrates subtasks of an avoidance maneuver trajectory circuit 204. The avoidance maneuver trajectory circuit's 204 subtasks may include monitoring aircraft location and state 214, querying databases 216, calculating a trajectory 218, calculating an avoidance maneuver 220, and issuing commands 222 to the flight control system 120.

The avoidance maneuver trajectory circuit 204 monitors aircraft location and state dynamically 214, which may be received from the GPS 142a and/or the aircraft data system 228, for example. The avoidance maneuver trajectory circuit 204 then queries databases 216, such as the one or more databases 224. More specifically, based at least in part on the current location and state of the aircraft 100, the avoidance maneuver trajectory circuit 204 queries the airspace, terrain, and environment databases 224a, 224b, 224c for data relevant to the current location and state.

The avoidance maneuver trajectory circuit 204 may calculate a trajectory 218. More specifically, the avoidance maneuver trajectory circuit 204 can calculate trajectories continuously that are clear of terrain and accounts for airspace and other factors, even without the presence of traffic obstacles. These default trajectories can define safe zones, where the ASA system 200 knows the aircraft 100 will not conflict with terrain or airspace.

The avoidance maneuver trajectory circuit 204 may also calculate an avoidance maneuver 220. That is, when information on potentially dangerous obstacles is received from the obstacle detection circuit 202, the avoidance maneuver trajectory circuit 204 can immediately calculate a flightpath trajectory to avoid the traffic obstacle(s), while also considering other nearby traffic, terrain, obstacles, and nearby airspace based on data from the one or more databases 224. For instance, if the ASA system 200 has possible avoidance trajectories either to the right or left, but the data that the avoidance maneuver trajectory circuit 204 has shown that there is conflicting terrain or restricted airspace to the right of the aircraft 100, then the avoidance maneuver trajectory circuit 204 will plan an avoidance trajectory to the left side instead. Therefore, when an obstacle threat report from the obstacle detection circuit 202 is received, the avoidance maneuver trajectory circuit 204 recalculates a trajectory to avoid the obstacle, while also avoiding terrain, accounting for airspace, and operating within a/c performance envelope.

The avoidance maneuver trajectory circuit 204 issues the resulting commands 222 to flight control system 120 to execute the avoidance maneuver. Depending on the type of flight control system 120, the resulting commands may be, for example, a commanded waypoint or speed, heading, altitude commands.

FIG. 3 illustrates an example navigational method 300 for operating an aircraft 100 equipped with an ASA system 200. For purposes of this example, assume that the aircraft 100 is performing a loitering mission at a relatively low level in an environment with a mountainous terrain. Upon start up at step 302, the ASA system 200 determines the state of the aircraft 100 and the surrounding environment at step 304. For example, the obstacle detection circuit 202 evaluates the location to identify and/or locate the mountains. The obstacle detection circuit 202 may also determine that the current time of year is summer based on, for example, the location (e.g., via GPS data) and an internal calendar, which may be supplemented/confirmed using one or more sensors (e.g., thermometers, light sensors, barometers, etc.). The one or more sensors may also be used to determine the current weather.

Based on the state of the aircraft 100 and the surrounding environment, the obstacle detection circuit 202 may set the sensor modes for each of the obstacle sensors 226 at step 306. When the aircraft 100 is in a loitering mission, the obstacle detection circuit 202 may command both the vision-based sensor and a radar sensor to be in 360-degree mode, thereby looking for obstacles on all sides of the aircraft 100. At step 308, the obstacle detection circuit 202 may assign weights to the various sensors 110 (e.g., obstacle sensors 226). For example, if the weather is clear (e.g., high visibility), the ASA system 200 may set obstacle detection weights that favor the sensor data from vision-based obstacle sensors, since hard-to-detect non-cooperative obstacles such as paragliders might be expected under these conditions.

At step 310, the ASA system 200 evaluates sensor data captured from the obstacle sensors 226. Although it is possible to detect an obstacle using multiple sensors (e.g., both the vision and radar sensors), where the weighting factor favors the vision-based system, the vision-based system is given preference (or priority) when evaluating the sensor data from both sensors. At step 312, the obstacle detection circuit 202 generates threat information and reports the data reflecting the detected obstacles to the avoidance maneuver trajectory circuit 204. At step 314, the avoidance maneuver trajectory circuit 204 dynamically monitors the location and state of the aircraft 100 in the environment. In additional to monitoring sensor data, the avoidance maneuver trajectory circuit 204 queries at step 316 one or more databases 224, which may identify, for example, nearby mountainous terrain, restricted airspace, etc. Based at least in part on the sensor data and the database information, the ASA system 200 evaluates the potential avoidance maneuvers and calculates a trajectory command for the aircraft. At step 320, the trajectory command is communicated as a command to the flight control system 120 of the aircraft 100 to complete the maneuver. If the mission is complete at step 322, the 300 may end at step 324. Otherwise, the navigational method 300 returns to step 304, where the process repeats.

While the navigational method 300 is illustrated as an example having a particular combination of steps, one of skill in the art would appreciate that fewer or additional steps may be implemented. In certain aspects, one or more steps may be performed in parallel. Further, one or more steps may be optional and omitted from the navigational method 300, or performed separately and/or upon request from an operator. In some aspects, one or more steps may be conditional, such that execution of the one or more steps may be contingent upon predetermined requirements and/or conditions. Moreover, the order in which the steps are cycled may be rearranged depending on the needs of the operator or the system.

While the ASA system 200 is described having certain features, other extra features can be considered optional, and could be added or subtracted as software upgrades, depending on user needs and budget. For instance, system adjustments may be based only on airspace or geography, without including adjustments for time of year or time of day. This could be added as an upgrade on a cost basis. Another variation could be the system installed in a piloted aircraft, as a complementary obstacle detection system, still using the situation-based blending of sensor data to give obstacle alerts and recommended avoidance trajectories to a human pilot. Yet another variation would be for the avoidance maneuver trajectory circuit 204 to include additional logic to account for balancing avoidance maneuvers against passenger comfort and safety, to be used for pilot-less autonomous aircraft carrying passengers, or could also be used in the variation described above for piloted aircraft. This variation would balance obstacle threat level and the maneuvers required to avoid the obstacle, against passenger comfort factors such as accelerations and jerk (change in acceleration). The ASA system 200 may be employed in military, government, and civilian applications. Though, the ASA system 200 is particularly useful for aircraft 100 with a wide range of operating altitudes and airspace types, such as tactical- or MALE-class aircraft 100.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the disclosure may therefore be practiced otherwise than as specifically described above.

What is claimed is:

1. An adaptive sense and avoid system for use with an aerial vehicle in an environment, the adaptive sense and avoid system comprising:
   a processor operatively coupled with a flight controller and a memory device;
   a plurality of sensors coupled to the aerial vehicle, each of the plurality of sensors configured to generate sensor data reflecting a position of an obstacle in the environment;
   an obstacle detection circuit operatively coupled to the processor and the plurality of sensors, the obstacle detection circuit configured to blend the sensor data from each of the plurality of sensors to identify obstacles in the environment and to generate obstacle information that reflects a best estimate of a position of the obstacle in the environment,
   wherein the obstacle detection circuit is configured to
      (i) set a sensor mode for each of a plurality of sensors based at least in part on a present state of the aerial vehicle and a condition of the environment, and
      (ii) assign a weight to the sensor data from each of the plurality of sensors as a function of sensor type, the present state of the aerial vehicle and the condition of the environment; and
   an avoidance trajectory circuit operatively coupled to the obstacle detection circuit and the processor,
   wherein the obstacle detection circuit is configured to
      (i) calculate trajectory data as a function of the obstacle information and information from one or more databases, and
      (ii) communicate the trajectory data to the flight controller.

2. The adaptive sense and avoid system of claim 1, wherein the one or more databases comprises (i) an airspace database of airspace data reflecting a defined legal airspace for the environment, (ii) an environment database of environmental data reflecting environmental factors for the environment, and (iii) a terrain database of terrain data reflecting terrain characteristics of the environment.

3. The adaptive sense and avoid system of claim 2, wherein the obstacle detection circuit is configured to assign a first weight to sensor data from a first sensor and to assign a second weight to sensor data from a second sensor as a function of the airspace data.

4. The adaptive sense and avoid system of claim 2, wherein the obstacle detection circuit is configured to assign a first weight to sensor data from a cooperative sensor and to assign a second weight to sensor data from a non-cooperative sensor as a function of the airspace data, wherein the first weight is greater than the second weight.

5. The adaptive sense and avoid system of claim 2, wherein the obstacle detection circuit is configured to assign a first weight to sensor data from a first sensor and to assign a second weight to sensor data from a second sensor as a function of the environmental data.

6. The adaptive sense and avoid system of claim 5, wherein the obstacle detection circuit is configured to assign a lower weight to sensor data from visual sensors when the environmental data reflects poor visibility for the environment.

7. The adaptive sense and avoid system of claim 2, wherein the obstacle detection circuit is configured to identify obstacles dynamically as a function of each of the airspace data, the environmental data, and the terrain data.

8. The adaptive sense and avoid system of claim 2, wherein the avoidance trajectory circuit is configured to calculate trajectory data dynamically as a function of at least one of the airspace data, the environmental data, and the terrain data.

9. The adaptive sense and avoid system of claim 2, wherein the adaptive sense and avoid system is communicatively coupled with a human-machine interface to provide a control and communication interface between the adaptive sense and avoid system and a human operator.

10. A method for navigating an aerial vehicle in an environment, the method comprising:
   determining, via a processor, a state of the aerial vehicle and the environment, wherein the processor is operatively coupled with a flight controller and a memory device having one or more databases;
   setting a sensor mode for each of a plurality of sensors based at least in part on the state of the aerial vehicle and the environment, wherein each of the plurality of sensors is configured to generate sensor data reflecting positions of obstacles in the environment;
   assigning, via an obstacle detection circuit, a weight to the sensor data from each of the plurality of sensors as a function of the state of the aerial vehicle and the environment, wherein the obstacle detection circuit is operatively coupled with the processor;
   generating, via the obstacle detection circuit, obstacle information reflecting a best estimate for an obstacle's position in the environment;
   monitoring, via the processor, the state of the aerial vehicle and the environment;
   querying the one or more databases to identify any flight constraints upon the aerial vehicle;
   calculating, via an avoidance trajectory circuit, a trajectory command for the aerial vehicle as a function of the obstacle information and the one or more databases, wherein the avoidance trajectory circuit is operatively coupled with the processor; and
   communicating the trajectory command to the flight controller.

11. The method of claim 10, wherein the one or more databases comprises (i) an airspace database of airspace data reflecting a defined legal airspace for the environment, (ii) an environment database of environment; data reflecting environmental factors for the environment, and (iii) a terrain database of terrain data reflecting terrain characteristics of the environment.

12. The method of claim 11, wherein, during the assigning step, the obstacle detection circuit is configured to assign a first weight to sensor data from a first sensor and to assign a second weight to sensor data from a second sensor as a function of the airspace data.

13. The method of claim 11, wherein, during the assigning step, the obstacle detection circuit is configured to assign a first weight to sensor data from a cooperative sensor and to assign a second weight to sensor data from a non-cooperative sensor as a function of the airspace data, wherein the first weight is greater than the second weight.

14. The method of claim 11, wherein, during the assigning step, the obstacle detection circuit is configured to assign a first weight to sensor data from a first sensor and to assign a second weight to sensor data from a second sensor as a function of the environmental data.

15. The method of claim 14, wherein, during the assigning step, the obstacle detection circuit is configured to assign a lower weight to sensor data from visual sensors when the environmental data reflects poor visibility for the environment.

16. The method of claim 11, wherein, during the step of generating the obstacle information, the obstacle detection circuit is configured to identify obstacles dynamically as a function of each of the airspace data, the environmental data, and the terrain data.

17. The method of claim 11, wherein, during the step of calculating the trajectory command, the avoidance trajectory circuit is configured to calculate trajectory data dynamically as a function of at least one of the airspace data, the environmental data, and the terrain data.

18. An aerial vehicle comprising:
   a flight controller;
   a processor operatively coupled with the flight controller and a memory device, wherein the memory device comprises
      (i) an airspace database of airspace data reflecting a defined legal airspace for an environment,
      (ii) an environment database of environments data reflecting environmental factors for the environment, and
      (iii) a terrain database of terrain data reflecting terrain characteristics of the environment;
   a plurality of sensors configured to generate sensor data reflecting a position of an obstacle in the environment;
   an obstacle detection circuit operatively coupled to the processor and the plurality of sensors, the obstacle detection circuit configured to blend the sensor data from each of the plurality of sensors to identify obstacles in the environment and to generate obstacle information that reflects a best estimate of a position of the obstacle in the environment,
   wherein the obstacle detection circuit is configured to
      (i) set a sensor mode for each of a plurality of sensors based at least in part on a present state of the aerial vehicle and a condition of the environment, and
      (ii) assign a weight to the sensor data from each of the plurality of sensors as a function of sensor type, the present state of the aerial vehicle and the condition of the environment; and
   an avoidance trajectory circuit operatively coupled to the obstacle detection circuit and the processor,
   wherein the obstacle detection circuit is configured to
      (i) calculate trajectory data as a function of the obstacle information and information from at least one of the airspace database, the environment database, and the terrain database, and
      (ii) communicate the trajectory data to the flight controller.

19. The aerial vehicle of claim 18, wherein the obstacle detection circuit is configured to assign a lower weight to sensor data from visual sensors when the environmental data reflects poor visibility for the environment.

20. The aerial vehicle of claim 18, wherein the obstacle detection circuit is configured to assign a first weight to sensor data from a cooperative sensor and to assign a second weight to sensor data from a non-cooperative sensor as a function of the airspace data, wherein the first weight is greater than the second weight.

* * * * *